United States Patent [19]

Brueck et al.

[11] Patent Number: 5,738,835
[45] Date of Patent: Apr. 14, 1998

[54] PROCESS FOR THE PURIFICATION OF PROCESS GASES BY CATALYTIC OXIDATION

[75] Inventors: Matthias Brueck, Rodenbach; Hans Reitz, Rosbach, both of Germany

[73] Assignee: Zimmer Aktiengesellschaft, Germany

[21] Appl. No.: 645,137

[22] Filed: May 13, 1996

Related U.S. Application Data

[63] Continuation-in-part of Ser. No. 398,969, Mar. 2, 1995, abandoned.

[30] Foreign Application Priority Data

Aug. 31, 1994 [DE] Germany ............ 44 30 938.4

[51] Int. Cl.⁶ .......................................... B01J 8/00
[52] U.S. Cl. ............ 423/210; 423/245.3; 423/351; 528/272; 528/274
[58] Field of Search ................ 423/245.3, 351, 423/210; 528/272, 274

[56] References Cited

U.S. PATENT DOCUMENTS

| | | | |
|---|---|---|---|
| 3,756,990 | 9/1973 | Jaeger | 260/75 M |
| 4,528,170 | 7/1985 | Meier zu Koecker et al. | 423/245 |
| 5,213,492 | 5/1993 | Ho | 431/10 |
| 5,339,633 | 8/1994 | Fujii et al. | 60/648 |

OTHER PUBLICATIONS

International Publication No. WO 95 / 02446, published 26 Jan. 1995.

*Primary Examiner*—Wayne Langel
*Attorney, Agent, or Firm*—McDonnell Boehnen Hulbert & Berghoff

[57] ABSTRACT

Process for purification of essentially oxygen-free process gases by catalytic oxidation of the oxidizable, mainly organic impurities with the addition of a oxygen-containing gas, where oxygen-containing gas is added to the process gas in an amount responsive to the carbon monoxide content of the process gas measured after oxidation. The carbon monoxide set point is in the range of 10 to 1000 vpm.

9 Claims, No Drawings

PROCESS FOR THE PURIFICATION OF PROCESS GASES BY CATALYTIC OXIDATION

This application in a continuation of application Ser. No. 08/398,969 filed Mar. 2, 1995, abandoned.

Of which the following is a specification.

This invention concerns a process for purifying essentially oxygen-free process gases by catalytic oxidation of the oxidizable impurities which are mostly organic substances by adding a gas containing oxygen.

BACKGROUND OF THE INVENTION

In the chemical industry, including the plastics industry, reactions are often carried out in an inert gas atmosphere. The inert gas which is essentially free of oxygen consists mostly of nitrogen, noble gases or carbon dioxide and it serves to keep atmospheric oxygen away from the reactants and/or remove the reaction by-products from the reaction system. In doing so, the inert gas absorbs small amounts of the reaction components and/or reaction by-products, depending on the prevailing partial vapor pressures, and these substances must then be removed before the gas can be reused.

PRIOR ART

A conventional method of purification of such process gases consists of catalytic oxidation of the organic impurities and the other oxidizable impurities with an excess of a gas that contains oxygen (Erdöl, Erdgas, Kohle 109/7–8 1993 pp. 322–328). Then the excess oxygen is removed by catalytic hydrogenation and the gas is dried while the resulting carbon dioxide is absorbed or remains in the gas (U.S. Pat. No. 3,756,990 and European Patent 222,714). A disadvantage of this process is that highly explosive and flammable hydrogen is required to remove the excess oxygen and therefore extensive safety requirements must be strictly observed.

The removal of oxygen from nitrogen by catalytic oxidation with the addition of an excess of a hydrocarbon gas is another known process that is unsuitable in the present case because the excess hydrocarbon remains in the nitrogen (U.S. Pat. No. 5,320,818). So far, the solution whereby a stoichiometric amount of methanol is added has not gained any industrial acceptance because of the very high cost of the methanol control and fed system (U.S. Pat. No. 4,859, 435).

Attempts to perform the catalytic oxidation of the oxidizable impurities by adding a stoichiometric amount of oxygen according to a residual oxygen content of less than 10 vpm have also proven to be impracticable on an industrial scale. First, a control tolerance of 0 to 10 vpm oxygen makes very high demands on the oxygen measurement equipment and the control circuit. Secondly, large amounts of air (as a gas that contains oxygen) must be added by metered addition with an accuracy of much less than 1% and with a response time of less than 1 minute, depending on the impurities in the process gas, where a 1% air excess already corresponds to an oxygen excess of about 50 vpm. Such a regulation of air flow is practically impossible to implement.

THE INVENTION

Therefore, the object of the present invention is to provide a process for purification of essentially oxygen-free process gases by catalytic oxidation of the oxidizable impurities, mainly organic compounds, by metered addition of an oxygen-containing gas such that the purified process gas has an oxygen content of less than 10 vpm and an unoxidized organic impurity content of less 10 ppm. This must be done without the use of hydrogen and at a reasonable cost for reliable regulation of the process on an industrial scale.

This object is achieved by adding an oxygen-containing gas to the process gas whereby the amount of added gas is limited by using a predefined level of the carbon monoxide content of the process gas measured after oxidation in the range of 10 to 1000 vpm as the regulating value.

The process according to this invention is suitable for purification of inert process gases such as nitrogen, noble gases, carbon dioxide or mixtures of these gases that are contaminated with mainly organic oxidizable compounds and have an oxygen content (before purification) that is much lower than the oxygen concentration required for complete oxidation of the oxidizable compounds contained therein. Such inert gases are used, for example, as protective gases for chemicals that are sensitive to oxygen and are stored in tanks or they may be used in carrying out chemical reactions for inertization of reactors and/or as entraining agents for volatile reaction by-products. The present invention is preferably used for purification of inert gas to be recirculated in thermal solid-phase treatment of condensation polymers such as nitrogen contaminated with acetaldehyde, ethylene glycol and low molecular condensation products from solid-phase crystallization and post-condensation and/or dealdehydization of ethylene terephthalate homopolymers and copolymers.

The impurities to be oxidized are of course determined by the origin of the process gases and consist primarily of organic compounds plus carbon monoxide and optionally nitrogen compounds. The preferred area of use is for purification of inert gases containing oxidizable impurities consisting exclusively of the elements C, H, O and/or N in the range of 50 to 10,000 ppm and other oxidizable impurities of less than 30 ppm. Other oxidizable impurities include primarily volatile components of catalysts and, in the case of gases from polymer processes, stabilizers.

The oxygen-containing gas is either pure oxygen or a mixture of oxygen and inert gases such as nitrogen or carbon dioxide, preferably air.

Oxidation of the impurities takes place in a known way on a solid catalyst consisting of noble metals, especially platinum and/or palladium, at temperatures in the range of 250°–600° C. or consisting of mixed oxides, especially those of vanadium, chromium and/or tungsten, at temperatures in the range of 400°–700° C. Suitable catalysts and reactors with slabs of honeycomb catalysts or with a loose bed of catalysts are available commercially. In selecting the catalyst, any impurities in the process gas that act as a catalyst poison must be taken into account. The throughput or the space velocity of the process gases depends on the specifications of the catalyst supplier. A space velocity in the range of 1000 to 10,000 $h^{-1}$ is conventional. The process gas is heated to the oxidation temperature, if necessary, by heat exchange with the gases leaving the oxidation reactor and/or by external heating—for example, by electric heating or by means of a separate heating circuit.

Before entering the catalytic oxidation reactor, an oxygen-containing gas is added to the process gas. The amount of the oxygen-containing gas is regulated and limited by a predefined level of the carbon monoxide content of the process gas measured downstream from the reactor to be in the range of 10 to 1000 vpm. For technical control reasons, the oxygen-containing gas is added either through a single complete stream that is regulated in response to the carbon monoxide measurement or through a substream with a fixed setting and a residual stream that is regulated in response to the carbon monoxide measurement.

The oxidation of the carbonaceous impurities takes place by way of the intermediate formation of carbon monoxide up to carbon dioxide. After oxidation, there remains essentially only carbon dioxide plus oxygen when working with a definite oxygen excess, whereas when working with a definite deficiency of oxygen, larger amounts of carbon monoxide are present in addition to unconverted impurities. The carbon monoxide set point used as the regulating value or control parameter according to this invention is adjusted within the claimed range of 10 to 1000 vpm, so that after oxidation, the given limit concentration of the gas of less than 10 vpm oxygen and less than 10 ppm unoxidized organic impurities is not exceeded even for a short period of time if there are fluctuations in the concentration of oxidizable impurities and/or in the total amount of gas to be purified, taking into account the response time of the control system. If great fluctuations in the gas to be purified are expected, the carbon monoxide set point is set in the upper range (approximately 200 to 1000 vpm), whereas if the gas is expected to be practically constant, the carbon monoxide set point is set in the lower range (approximately 10 to 200 vpm). A carbon monoxide set point in the range of 30 to 300 vpm is suitable for most applications.

The carbon monoxide content is measured in a known way with a commercial device, preferably continuously. The possibility of the other gas components influencing the measured values must be ruled out. For example, measurement using a micro fuel cell where electrochemical oxidization of carbon monoxide takes place on the measurement electrode has proven to be suitable.

Other means of measurement can be used equally well. In general, the determination of carbon monoxide is not meticulous and can be performed with an accuracy of about ±2% in the range of 10 to 1000 vpm. The carbon monoxide content of the purified gas is thus a very reliable control parameter.

The residual oxygen content need not be determined in the process according to this invention. In particular, this value does not serve as a control parameter for metered addition of the oxygen-containing gas that is to be supplied. However, the oxygen concentration may be used as a control limit value, preferably in the range of 5–10 vpm which, if exceeded, causes the process to be interrupted. The oxygen concentration of the process gas downstream of the oxidation reactor is an indicator of aleactivation of the catalyst and/or a disturbance in the system. In these cases the oxygen content in the process gas increases greatly downstream from the oxidation reactor while the carbon monoxide concentration remains almost constant.

The oxygen determination can be performed in any desired manner, but it is important to be sure that the results are not influenced by other gas components, specifically carbon dioxide. For example, measurement of the voltage between two electrodes immersed in an acid electrolyte which changes as a function of the amount of oxygen dissolved in the electrolyte has proven to be a suitable method.

After the process gas leaves the oxidation reactor packed with active catalysts, it consists essentially of an inert gas containing <10 vpm, preferably<5 vpm oxygen <10 ppm organic impurities 10–1000 vpm carbon monoxide plus carbon dioxide and water.

Depending on the intended use, the process gas can be reused without further purification. With the constant recirculation of the gas between the process and the purification procedure according to this invention, carbon dioxide and water will accumulate in the gas. Therefore, it may be necessary to completely or partially remove these components downstream from the oxidation reactor before recycling back to the process. Carbon dioxide can be removed by absorption in an alkaline liquid or on molecular sieves and water by absorptive drying with molecular sieves, silica gel, etc. Another possibility is to discharge a side stream.

SPECIFIC EXAMPLES

Examples 1–6

Polyethylene terephthalate pellets were first crystallized while continuously passing nitrogen through the pellets and were then subjected to solid-phase polycondensation. The stream of nitrogen leaving the solid-phase polycondensation reactor contained ethylene glycol, acetaldehyde, low molecular condensation products and moisture in various amounts, depending on the operating conditions in solid-phase polycondensation.

This stream of nitrogen was passed through an oxidation reactor at a space velocity of 2580 $h^{-1}$ after heating it to approximately the same temperature of the oxidation reactor. At a temperature of 400° C., the oxidation reactor contained 7.6 kg of a 1:1 mixed oxidation catalyst from Heraeus in Hanau, Germany consisting of type K-0264 with 0.5% palladium on aluminum oxide and type K-0152 with 0.1% platinum on aluminum oxide and having a bulk density of 700 g/l. Approximately 2.5 m upstream of the oxidation reactor, air at ambient temperature was fed into the nitrogen line in proportion to the carbon monoxide content measured downstream of the oxidation reactor.

The carbon monoxide content was measured with a model 6420 meter from AMS Messteehnik GmbH in Diehlheim, Germany which had a measurement range of 0–10,000 ppm and a resolution of 1 ppm. The carbon monoxide content was measured on a substream of the process gas after leaving the oxidation reactor. In addition, the oxygen content was also measured on a substream downstream from the oxidation reactor using a model EL 7 measurement instrument with a measurement range of 0–10,000 ppm and a resolution 0.1 ppm from Dr. Thiedig Anlagen und Analysentechnik GmbH [Dr. Thiedig's Installation and Analytical Technology] in Berlin, Germany. The organic carbon content, calculated as—$CH_2$—, was measured upstream and downstream of the oxidation reactor with a model 2000 E FID from Amluk GmbH in Oberaudorf, Germany.

The stream of nitrogen leaving the oxidation reactor was subjected to drying with a molecular sieve (4 Å) at ambient temperature and was then recycled back to the polyester crystallization and solid-phase polycondensation process with a residual moisture content less than 20 ppm ($P_2O_5$ measurement cell).

Table 1 summarizes the results obtained over a period of several hours of operation while the air supply was adjusted in response to various carbon monoxide levels. The values given in parentheses refer to individual peak values.

Example 7

The equipment and procedure corresponded to those in Examples 1–6 but the oxidation reactor contained 12 kg of an oxidation catalyst from Doduco GmbH & Co., Sinshelm, Germany, type COEX 0.1 with 0.1% platinum deposited on a support material and with a bulk density of 800 g/l. The temperature of the catalyst was at first 400° C. and later was 440° C. The process gas to be purified consisted of nitrogen contaminated with ethylene glycol. The results obtained over several hours of operation are also summarized in Table 1.

As this table shows, the carbon monoxide values fluctuate around the set point, which results in corresponding increase or decrease in the amount of air supplied. Despite fluctuations in the composition of the gas to be purified, the purified gas consistently contained less than 10 ppm unoxidized organic impurities and less than 5 vpm oxygen. A more precise measurement of these two components was performed only on random samples. This yielded exclusively values of less than 3 ppm for the organic impurities and less than 3 vpm oxygen.

Tests of the process according to this invention during an uninterrupted period of 3 weeks of operation proceeded without the least interference in the carbon monoxide-based control system despite changes in various parameters.

fied gas ranges from 0–10 vpm and maintaining said quantity of oxygen in the range of 0–10 vpm in the purified gas by continuously measuring the carbon monoxide content of said purified gas and adjusting the quantity of oxygen added in the catalytic oxidation in response to this measurement such that the quantity of carbon monoxide in the purified gas is in the range of 30–1000 vpm.

2. Process according to claim 1, in which said process gas, prior to oxidation, is an inert gas containing oxidizable impurities, consisting essentially of the elements C, H, O and/or N, in the range of 50 to 10,000 ppm plus other oxidizable impurities in an amount less than 30 ppm.

3. Process according to claim 1 in which said purified process gas contains carbon dioxide which is removed from said purified gas by absorption.

4. Process according to claim 1 in which said purified process gas is subjected to drying.

5. Process according to claim 1, in which said inert process gas is contaminated with acetaldehyde, ethylene glycol and low molecular condensation products from thermal solid-phase treatment of ethylene terephthalate polymer.

TABLE 1

| Example No. | 1 | 2 | 3 | 4 | 5 | 6 | 7 |
|---|---|---|---|---|---|---|---|
| $N_2$ throughput ($m^3$ [STP]/h) | 28 | 28 | 28 | 28 | 28 | 28 | 32 |
| $N_2$ temperature downstream from the reactor (°C.) | 381 | 382–383 | 381 | 382 | 384 | 383 | 389–390 417–418[a] |
| CO downstream from the reactor | | | | | | | |
| Set point (vpm) | 50 | 50 | 100 | 100 | 200 | 300 | 500 |
| Measured values (vpm) | 44–55 (44–61) | 50–59 (40–60) | 99–115 (61–136) | 93–110 (59–120) | 178–223 (176–258) | 303–352 | 450–550 (450–600) |
| Air supply (l/h) | 36–39 (30–39) | 52–59 (52–67) | 53–62 (46–64) | 60–68 (55–72) | 58–67 | 64–81 | 590 (570–590) |
| Organic carbon as —$CH_2$— | | | | | | | |
| upstream from the reactor (ppm) | 150–160 (100–170) | 180–190 (180–200) | 180 (160–190) | 220–260 | 180–200 | 180–200 | 1380–1500 |
| downstream from the reactor (ppm) | <10 | <10 | <10 | <10 | <1 | 1.3–2.8 | <10 |
| $O_2$ downstream from the reactor (vpm) | <5 | 2.2–<5 | <5 | 1.7–2.1 | 1.8–2.0 | 2.0 | <5 |

Note:
[a] Catalyst temperature 440° C.

We claim:

1. A continuous process for purifying a gas from the thermal solid-phase treatment of condensation polymers which is carried out in the presence of an inert process gas essentially free of oxygen, which inert process gas absorbs small quantities of impurities generated during said treatment, and said inert process gas having laid impurities is purified for recycling back to said thermal solid-phase treatment, the improvement for purifying said inert process gas having said impurities for reuse which comprises
catalytically oxidizing the impurities in said inert process gas having said impurities to carbon oxides, including carbon monoxide, by adding oxygen to said gas, whereby the quantity of oxygen remaining in the puri- 6. The process according to claim 1 in which the level of carbon monoxide in said purified gas is in the range of 30–300 vpm.

7. The process according to claim 1 in which said inert process gas, prior to oxidation, is an inert gas containing oxidizable impurities.

8. The process according to claim 1 in which said adding of oxygen to said gas having impurities to catalytically oxidize the impurities is accomplished by adding air.

9. A process according to claim 1 in which said inert process gas comprises nitrogen.

* * * * *